United States Patent Office 3,443,049
Patented May 6, 1969

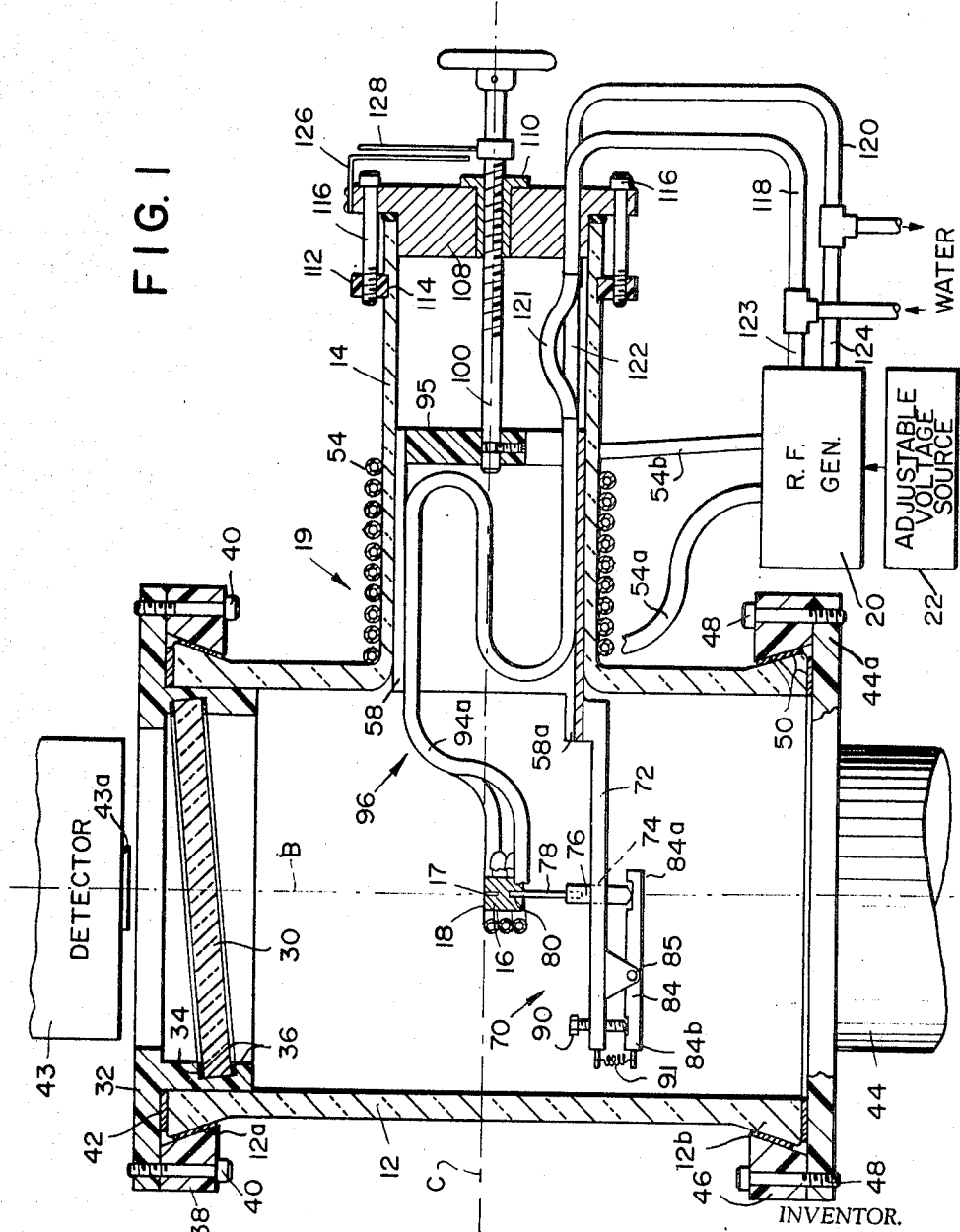

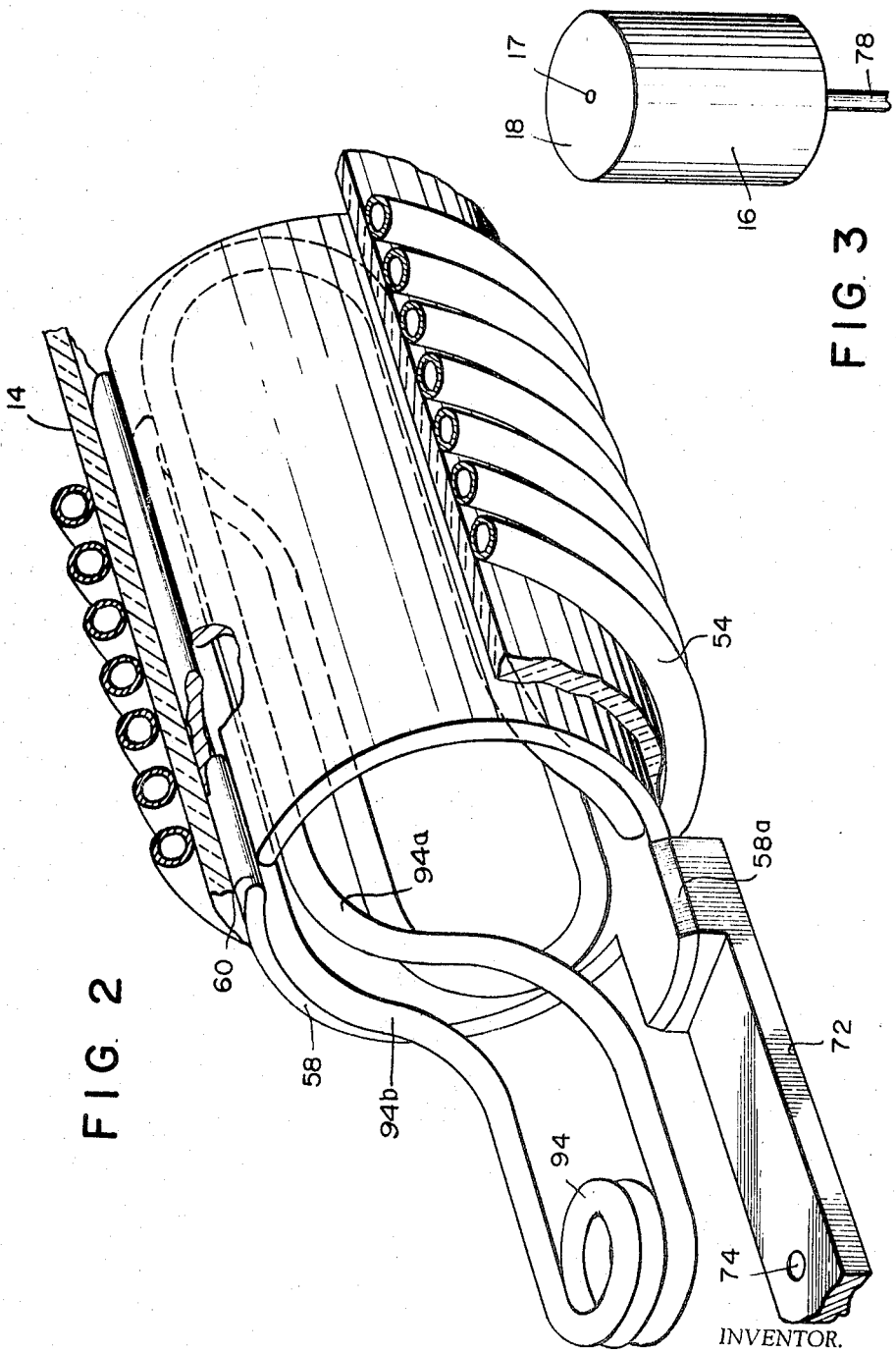

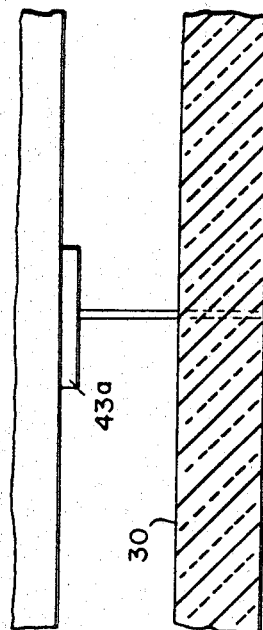
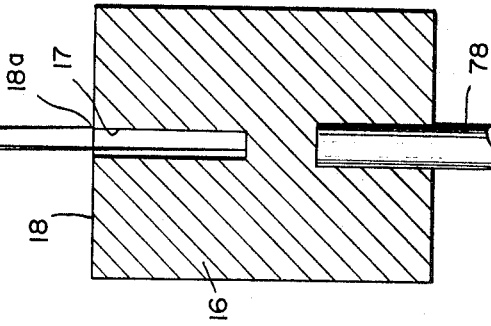

3,443,049
SPECIMEN HEATING AND ROTATING SYSTEM
Lawrence C. Hoagland, Concord, Mass., assignor to
Dynatech Corporation, Cambridge, Mass.
Filed Dec. 29, 1966, Ser. No. 605,666
Int. Cl. H05b 5/18, 9/02
U.S. Cl. 219—10.43                    18 Claims

ABSTRACT OF THE DISCLOSURE

A specimen heating and rotating system employs an RF inductor which generates a magnetic field which is symmetric about an axis. An RF energy concentrator is rotatably supported coaxially with the magnetic field. The concentrator supports a specimen so that a portion thereof lies on that axis and inductively heats the specimen. The concentrator and specimen are both situated within a vacuum-tight chamber having a window overlooking the specimen surface. The concentrator can be turned on its axis from outside the chamber to rotate the specimen surface about the axis.

BACKGROUND OF THE INVENTION

Field of invention

The present invention has application in most situations where it is desired to observe from various angles the properties or characteristics of a specimen maintained at a stable elevated temperature. For purposes of illustration, however, we will described this system in connection with the measurement of the emissivity of an opaque body.

Emissivity is the ratio of the radiant energy emitted from the surface of a heated specimen to that emitted from an equal area of a blackbody radiator at the same temperature and over the same wavelength band. Conveniently, the blackbody is contained in the specimen itself in the form of a relatively deep well therein. In this way, the temperatures of the specimen and blackbody are automatically the same for all practical purposes. By making radiation intensity measurements at several wavelengths or by scanning the entire wavelength spectrum, a complete curve of emissivity versus wavelength can be obtained.

If the intensity measurements are confined to the radiation beams leaving the specimen surface and blackbody in a direction normal thereto, one may compute the normal spectral emissivity of the specimen. Frequently, however, it is necessary to find also the angular dependence of the radiation emitted from the specimen in order to compute its hemispherical emissivity. For this, the surface radiation intensity at a fixed wavelength is measured at various angles from the normal to the surface and then compared to a blackbody measurement made normal to the blackbody.

For such emissivity measurements, it is desirable to heat the specimen and blackbody with RF induction heating because this heating technique offers several advantages not found with other heating methods. More particularly, induction heating obtains good temperature uniformity over the specimen. In addition, only the specimen itself is heated to a high temperature. This latter advantage is quite important because it insures that only the radiation from the specimen contributes to the measured results.

Heating by induction has a major drawback, however, in that it is difficult to obtain accurate measurements of the angular dependence of radiation. The specimen must be heated in a vacuum or controlled atmosphere. Accordingly, the primary winding of the RF transformer must be situated outside of the chamber to avoid arcing and corona discharge. This being the case, during slow rotation of the specimen and blackbody, the electrical coupling changes between the RF primary winding and the specimen. Consequently, during such rotation, the temperature of the specimen does not remain stable, making for errors in the radiation intensity measurements.

Description of prior art

Prior art systems have avoided the aforementioned problem by maintaining the specimen and blackbody stationary within a domed chamber and employing several detectors to sense the radiation emitted at various angles therefrom. These detectors are stationed at windows installed in the hemispherical top of the chamber. The measurements made by the different detectors are then collated to arrive at the angular dependence of radiation.

The results obtained from these prior systems are not entirely satisfactory, however, because the several windows through which the radiation is transmitted to the detectors often have slightly different transmission characteristics. Also, the different detectors have different responses. Accordingly, errors are introduced into the intensity measurements made at the different angles. In addition, the windows in the hemispherical chambers and detectors are necessarily spaced apart. Therefore, one cannot obtain a continuous measurement of radiation intensity versus angle of emission. Needless to say, also, these prior systems are very expensive because they require duplicate radiation detecting and analyzing equipment at each window.

It is an object of this invention to provide an improved specimen heating and rotating system which maintains a specimen at a stable temperature in a controlled atmosphere during slow rotation thereof. Another object of the invention is to provide an improved system for heating a specimen so that the specimen can be rotated without affecting its temperature. Another object of this invention is to provide a specimen heating and rotating system by which a uniformly heated specimen may be observed at various angles from a single vantage point under stable temperature conditions. A still further object of this invention is to provide a specimen heating and rotating system for measuring the angular dependence of radiation emitting from a specimen and blackbody under uniform temperature conditions.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the present system employs an RF transformer to heat the specimen. The transformer includes a helical high-voltage primary winding which generates a magnetic field which is symmetric about the winding axis. A single-turn, low-voltage secondary winding in the form of an axially slit tube is rotatively supported coaxially within the primary winding. A fixture protruding from one end of the secondary winding supports the specimen so that the specimen surface to be observed coincides with the common axis of the transformer windings. Preferably, the blackbody is contained in the specimen itself as described above. That is, the specimen has a small well formed in the observed surface.

A load coil connected to the secondary winding surrounds the specimen. The secondary winding and load coil comprise a concentrator which maximizes the energy coupling to the specimen for efficient heating thereof. The concentrator and specimen are all situated within a vacuum-tight chamber having a window overlooking the specimen surface and blackbody. The high-voltage primary winding, on the other hand, is located outside the chamber to avoid arcing and corona discharge within the chamber. The system heats the specimen and blackbody to a selected temperature. The thermal radiation emitted from the blackbody and from a small area on the specimen surface near the winding axis is alternately sensed by a detector situated at the window.

The secondary winding can be rotated about its axis from outside the chamber. This tilts the specimen surface relative to the chamber window. The small area on the specimen surface being observed is selected to be close to the axis of rotation of the secondary winding. Therefore, as the specimen tilts, the area moves very little laterally relative to the detector. Moreover, since the magnetic field generated by the system is axially symmetric, such rotation occurs without altering the electrical coupling between the various elements of the system. Accordingly, even during slow rotation of the specimen and blackbody, the temperature thereof remains stable. The radiation emitting from the surface at various angles can be sensed at the single chamber window using a single detector and a continuous accurate measurement made of the angular dependence of the radiation. A comparison of the radiation intensities from the specimen and from the blackbody yields the hemispherical emissivity of the specimen.

*Description of drawings*

FIG. 1 is a vertical section, with parts shown in elevation, of a specimen heating and rotating system embodying the principles of this invention;

FIG. 2 is an enlarged perspective view, with parts cut away, of a portion of the FIG. 1 system;

FIG. 3 is an enlarged perspective view of a specimen and blackbody such as used in the FIG. 1 system;

FIG. 4 is a schematic diagram illustrating the operation of the FIG. 1 system to measure radiation intensity in a direction normal to the specimen surface, and FIG. 5 is a similar diagram illustrating the operation of the FIG. 1 system to find the angular dependence of the thermal radiation from the specimen.

*Description of the preferred embodiment*

With reference to FIG. 1, the present system employs a cylindrical glass vacuum chamber 12 whose upper and lower ends are flanged at 12a and 12b respectively. A reduced diameter cylindrical extension 14 leads off the side of chamber 12 midway between its ends. The axis C of extension 14 is preferably perpendicular to the axis B of chamber 12. A cylindrical specimen 16 is mounted on end in chamber 12. As best seen from FIGS. 1 and 3, the specimen is of the conventional variety having a blackbody integral therewith in the form of a relatively deep axial well 17 extending into the specimen from the top surface 18 thereof.

The specimen 16 is inductively heated by means of an RF transformer indicated at 19 which is supported by extension 14. Transformer 19 is powered by a conventional RF generator 20 connected to a conventional adjustable voltage source 22.

The thermal radiation emitted by specimen 16, when heated, is transmitted through a quartz window 30 positioned in the end of chamber 12 above the specimen surface 18. Window 30 is supported by a nylon bushing slid into the end of chamber 12. Bushing 32 is grooved at 34 to receive window 30 and to maintain it in a position in which it is tilted approximately 5° from the axis C of extension 14. This is to prevent the radiation emitting from specimen 16 from being reflected back by the window to the specimen and thereby causing errors in the intensity measurements. Suitable gaskets 36 are installed around window 30 to insure a vacuum-tight seal between window 30 and bushing 32. Bushing 32 is clamped tightly to chamber 12 by means of a nylon clamping ring 38 engaging under flange 12a. An array of screws 40 extending through ring 38 and threadedly received in the flange 32a of bushing 32 draw the bushing down tightly over the end of chamber 12. Conventional gaskets 42 are installed between flange 12a and the bushing 32 and ring 38 to insure a vacuum-tight seal at those points.

Thermal radiation emitted from specimen 16 is collected at the aperture 43a of a radiation detector 43 positioned at window 30. Detector 43 may be any conventional infra-red spectrometer system for dispersing, detecting and recording radiation intensity.

A vacuum system is coupled to the lower end of chamber 12 by means of a conduit 44. Conduit 44 has a flange 44a which overhangs flange 12b of the chamber. Flange 44a is drawn tightly down on the chamber 12 by means of a nylon clamping ring 46 which engages under flange 12b. The flange 44a and ring 46 are drawn together by an array of screws 48 which extend through the ring 46 and screw into flange 44a. The usual gaskets 50 are provided between flange 12b and ring 46 and flange 44a to obtain a proper seal.

Transformer 19 comprises a helical high-voltage, high-impedance primary winding 54 in the form of a copper tube wound tightly about chamber extension 14. The winding 54 is located outside of chamber 12 so that is operates in the atmosphere to avoid arcing problems. The leads 54a and 54b of winding 54 are connected to generator 20 and water is circulated through the winding to cool it. Primary winding 54 generates an axially symmetric magnetic field within chamber extension 14. that is, the magnetic field generated by the winding is symmetric about the axis of the winding which coincides with the axis C of chamber extension 14 for reasons that will be discussed later.

Referring to FIGS. 1 and 2, the transformer 19 also has a single-turn secondary winding 58 in the form of a cylindrical copper tube slit axially at 60. Winding 58 is rotatively mounted in extension 14 and its axis coincides with the axis C of primary winding 54 and the extension. Winding 58 extends from a point midway along the length of extension 14 to chamber 12. Also, it has a small extension 58a, positioned opposite slit 60, which protrudes into chamber 12.

Specimen 16 is supported within chamber 12 by a support assembly indicated generally at 70 which is affixed to extension 58a. Assembly 70 comprises a bracket 72 having one end secured to the underside of extension 58a. Bracket 72 extends into chamber 12 below window 30 and beyond the chamber axis B. A circular passage 74 is formed in bracket 72 below the center of window 30. Passage 74 is perpendicular to the axis C of the transformer windings 54 and 58 for reasons that will become apparent later. A sleeve 76 made of a suitable high-temperature material such as alumina is slidably received within passage 74. Sleeve 76 supports a rod 78 made of a similar material which pilots into a passage 80 in the bottom of specimen 16.

The support assembly 70 also provides for alignment of specimen 16 so that its upper surface 18 coincides with the axis C. More particularly, a lever 84 is pivoted at 85 to an ear 86 depending from block 72. One end 84a of lever 84 engages under sleeve 76. The other end 84b of lever 84 engages under an adjusting screw 90 screwed down through bracket 72. A spring 91 stretched between the lever end 84b and the end of bracket 72 maintains lever end 84b in contact with screw 90. Thus, by adjusting screw 90, the sleeve 76 and hence the specimen 16 can be raised or lowered relative to bracket 72 and axis C. When the specimen is properly positioned within chamber 12, the well 17 is perpendicular to axis C. Also, the screw 90 is adjusted so that the upper surface 18 of specimen 16 coincides with the axis C as seen in FIG. 1.

A load coil 94 connected to secondary winding 58 surrounds specimen 16. Its number of turns is selected to optimize impedance match between the generator and load. Typically, in an installation where the primary winding 54 contains 10–15 turns, a three-turn load coil 94 is suitable. The voltage across the coil 94 should not be high enough to cause arcing within chamber 12 and extension 14 at a chamber pressure of 1–10 microns of mercury.

The leads 94a and 94b of coil 94 are brazed to the inside of transformer winding 58 at the top and bottom thereof. Then they pass out through a polytetrafluoroethylene hub 95 secured in the outer end of winding 58. Water is circulated through coil 94 to cool it and also to cool the winding 58 to minimize electrical losses in those elements.

The single-turn secondary winding 58 and load coil 94 together form a concentrator 96 which moves with the specimen and acts as an impedance match between primary winding 54 and the specimen thereby providing efficient energy coupling between the two. It enables the system to achieve very high specimen temperatures, i.e. on the order of 4000° K.

Referring to FIG. 1, concentrator 96 along with specimen 16 can be rotated about axis C by means of a quartz shaft 100 whose inner end is fastened to hub 95. A flanged end cap 108 engages over the open end of extension 14 with the shaft 100 passing through a rotary vacuum seal 110 therein. End cap 108 is clamped in place by a nylon clamping ring 112 engaging in a circumferential groove 114 in the wall of chamber extension 14 and screws 116.

Inlet and outlet water pipes 118 and 120 extending through cap 108 are connected to coil leads 94a and 94b by means of flexible hoses 121 and 122. Hoses 121 and 122 are made long enough to allow concentrator 96 to be rotated at least ±90° within chamber 12. As mentioned previously, water is also circulated through primary winding 54 by means of connecting pipes 123 and 124. A suitable isolating network is provided in generator 20 to electrically isolate these pipes.

A protractor 126 is mounted on end cap 108 so as to overhang shaft 100 and a pointer 128 secured to this shaft indicates the amount of rotation on the protractor.

Referring now to FIGS. 1 and 4, in operation, the top surface 18 of specimen 16 is aligned with the axis C by adjusting screw 90 as described above. The chamber 12 is then sealed and exacuated and the specimen 16 and integral blackbody 17 are inductively heated to the desired temperature. By virtue of the concentrator 96, most of the energy developed by the system is used to heat specimen 16. The field is concentrated around the specimen, where it is needed. This is in sharp contrast to prior comparable systems wherein the specimen is situated within the transformer secondary winding and a relatively small amount of the total energy developed performs a specimen heating function.

To measure the normal emissivity of the specimen, it is oriented so that its axis is parallel to axis B. The detector 43 then sights alternately on the well 17 constituting the blackbody and a small area 18a of specimen surface 18 adjacent well 17. Thus, the detecor alternately senses the thermal radiation $P_n$ emanating from well 17 and the radiation $Q_n$ emanating from surface area 18a and measures the two intensities. The spectral emissivity at the selected wavelength is then given by:

$$e = I/\bar{I} \qquad (1)$$

where:

$I$ equals the radiation intensity at a selected temperature from the surface portion 18a, and $\bar{I}$ is the radiation intensity from well 17 at the same temperature.

By taking measurements of several wavelengths or by scanning the entire spectrum, a complete curve of emissivity versus wavelength may be obtained. Total emissivity may then be computed by integrating the emissivity versus wavelength curve, using Plank's constant as a weighting function in accordance with well-known practice.

Referring now to FIGS. 1 and 5, to obtain the angular dependence of emission from specimen 16, the specimen is tilted relative to detector 43 by turning shaft 100. As best seen in FIG. 5, the detector 43 sights on the surface area 18a situated close to axis C. As the specimen surface 18 tilts about axis C, the detector senses the radiation emanating at various angles from surface area 18a. Thus, for example, when the specimen is vertical, the detector 43 receives radiation beam $P_0$. When it is tilted 10° about axis C, the detector senses radiation beam $P_{10}$. At 20° tilt, the detector detects radiation beam $P_{20}$. In this way, the system can take continuous readings of radiation intensity emanating from surface area 18a at any angle from 0° to ±90°.

In contrast to prior such instruments, the present system is able to rotate the specimen itself when taking these angular measurements because its surface 18 coincides with the axis of rotation C. This means that the small area 18a thereof whose radiation is being measured, moves only slightly relative to the detector 43. This minimizes errors caused by lateral movement of the surface area 18a relative to the detector, i.e. off axis B. Moreover, since the concentrator 96 moves with specimen 16 during this rotation, there is no change in the electrical coupling between secondary winding 58 and the coil 94 or between the coil and specimen 16. Finally, there is also constant coupling between the concentrator and the coaxial primary winding 54. This feature is very important because any change in the electrical coupling between the various elements during rotation would cause a corresponding change in the temperature of the specimen 16. Such temperature fluctuations would introduce relatively large errors in the radiation intensity measurements at various angles of inclination.

When measuring the angular dependence of radiation, the well 17 can no longer be used as a blackbody since the detector 43 would be sighting on the side wall of the well and it would no longer constitute an effective blackbody. Accordingly, for such angular measurements, the intensity of radiation from surface area 18a versus the angle of emission as read from protractor 126 is measured at a fixed wavelength. It is then compared to the radiation intensity from well 17 oriented in the normal position as described above in connection with FIG. 4. The hemisperical emissivity of specimen 16 is computed by integrating over the hemisphere (i.e. from + 90° to —90°) using the Lambert cosine law as a weighting function. The total hemispherical emittance may then be obtained by appropriate double integration over the desired wavelength spectrum and over the hemisphere in accordance with well-known techniques.

It will be seen from the foregoing then that my improved specimen heating and rotation system efficiently heats a specimen and blackbody to the same temperature in a controlled atmosphere and permits rotation thereof while maintaining temperature stability. While we have shown a system wherein the specimen is heated in a vacuum, obviously the vacuum system may be replaced by a suitable source of inert gas which could circulate through chamber 12. A vent for this gas may be included in end cap 108. In this way, the angular dependence of radiation or other characteristic of a specimen may be measured under precisely controlled temperature and atmospheric conditions. Furthermore, the measurement at all angles can be made from the same vantage point using a single optical and detection system.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A specimen heating and rotating system comprising
    (A) means (58, 70) for mounting a specimen surface coincident with an axis of rotation (C);
    (B) a detecting station (30) spaced from said surface;
    (C) means (19) for heating said specimen surface; and
    (D) means (100) for rotating said heated specimen surface about said axis whereby said heated surface may be viewed at different angles from said station.

2. A specimen heating and rotating system as defined in claim 1 wherein said heating means includes an RF induction coil (94), said coil
    (A) surrounding said specimen surface; and
    (B) rotatable with said surface about said axis.

3. A specimen heating and rotating system as defined in claim 1 wherein said heating means comprises
    (A) a concentrator (96) rotatable with said specimen surface about said axis, said concentrator including
        (1) a transformer secondary winding (58);
        (2) an RF induction coil (94), said coil
            (a) being electrically connected to said secondary winding, and
            (b) surrounding said specimen surface; and
    (B) a transformer primary winding (54) electrically coupled to said secondary winding.

4. A specimen heating and rotating system as defined in claim 3 and further including a vacuum-tight chamber (12, 14) surrounding said specimen surface and said concentrator, said specimen surface and said concentrator being rotatable within said chamber.

5. A specimen heating and rotating system comprising
    (A) means (19) for generating a magnetic field;
    (B) means (58, 70) for supporting a specimen (16) so that
        (1) said specimen is inductively heated to a selected temperature, and
        (2) a surface portion (18a) of said specimen coincides with an axis of rotation (C);
    (C) means (100) for rotating said specimen about said axis whereby said specimen may be reoriented without changing its said temperature.

6. A specimen heating and rotating system as defined in claim 5 and further including a vacuum-tight chamber (12) enclosing said specimen, said chamber having a detecting station (30) overlooking said specimen portion.

7. A specimen heating and rotating system as defined in claim 6 where said generating means comprises a transformer helical primary winding (54) situated outside of said chamber.

8. A specimen heating and rotating system as defined in claim 5 wherein said generating means comprises
    (A) a helical transformer primary winding (54);
    (B) a secondary winding (58) rotatively mounted coaxially within said primary winding;
    (C) a load coil (94) connected to said secondary winding, said load coil surrounding said specimen so as to maximize the energy coupling between said primary winding and said specimen.

9. A specimen heating and rotating system as defined in claim 8 and
    (A) further including a vacuum-tight chamber (12) enclosing said secondary winding, load coil and specimen, and
    (B) wherein said rotating means comprises a rotative member (100) which
        (1) is connected to said secondary winding, and
        (2) extends out of said chamber.

10. A specimen heating and rotating system as defined in claim 9 and further including means (44) for evacuating said chamber.

11. A specimen heating and rotating system as defined in claim 8 and further including
    (A) an RF generator (20) for energizing said primary winding, and
    (B) means (22) for adjusting the current through said primary winding so as to control the temperature of said specimen.

12. A specimen heating and rotating system comprising
    (A) means (54) for generating a magnetic field;
    (B) means (96) for concentrating in a locality the energy produced by said generating means, said concentrating means being rotatively mounted on an axis (C) in said field;
    (C) means (70) movable with said concentrating means for supporting a specimen (16) in said locality so that a surface thereof coincides with said axis, and
    (D) means (100) for rotating said concentrating means and specimen about said axis.

13. A specimen heating and rotating system as defined in claim 12 wherein said concentrating means comprises
    (A) an axially slit conducting tube (58), and
    (B) a load coil (94) connected to said tube at opposite sides of said slit (60), said load coil
        (1) extending out of said tube;
        (2) having its axis perpendicular to said axis, and
        (3) bounding said locality.

14. A specimen heating and rotating system as defined in claim 13
    (A) wherein said load coil has leads (94a, 94b) which are traced over and secured to inside wall portions of said tube, and
    (B) further including means (118, 120) for circulating water through said coil to cool said coil and said tube.

15. A specimen heating and rotating system as defined in claim 13 and
    (A) further including a vacuum-tight chamber (12) enclosing said concentrating means and said specimen, said chamber having a detecting station (30) overlooking said locality, and
    (B) wherein said rotating means is operable from outside of said chamber.

16. A specimen heating and rotating system as defined in claim 15 wherein said generating means comprises a helical primary transformer winding (54) wound coaxially with said tube outside of said chamber.

17. A specimen heating and rotating system as defined in claim 15 and further including means (70) for positioning said specimen so that a surface portion (18a) thereof coincides with said axis.

18. A specimen heating and rotating system comprising
    (A) a vacuum-tight cylindrical chamber (12), said chamber having (1) a cylindrical side extention perpendicular to said chamber; and
(2) a window in one end thereof;
(B) a transformer primary winding wound helically about said extension coaxially therewith;
(C) an axially slit tube rotatably mounted within said extension coaxially therewith;
(D) an induction coil, said coil
(1) being electrically connected to said tube at opposite sides of said slit, and
(2) extending axially out from said tube into said chamber;
(E) means movable with said tube for adjustably supporting a specimen within said coil so that a surface of said specimen
(1) coincides with the axis of said tube, and
(2) is positioned below said window;
(F) means extending out of said chamber for rotating said tube about said axis so as to tilt said specimen surface relative to said window;
(G) means for evacuating said chamber;
(H) means for indicating the rotation of said tube, and
(I) means for energizing said primary winding.

References Cited
UNITED STATES PATENTS 3,211,881  10/1965  Jablonski et al. _____ 219—10.67
3,352,991  11/1967  Clites _____ 219—10.79

RICHARD M. WOOD, *Primary Examiner.*

L. H. BENDER, *Assistant Examiner.*

U.S. Cl. X.R.

13–26; 219–10.79